INVENTOR.
Daniel J. Howles
BY
Frank A. Bower
his ATTORNEY

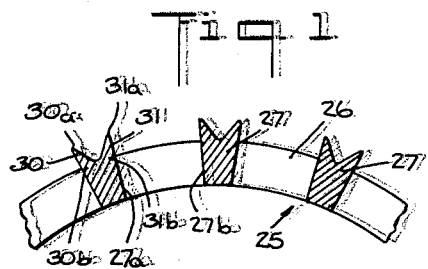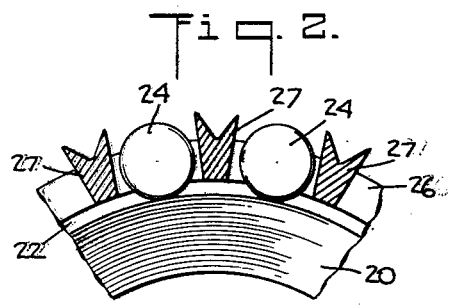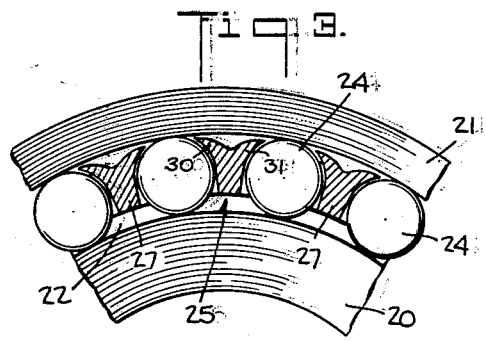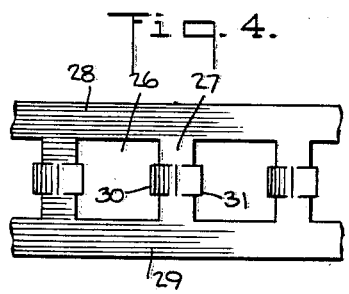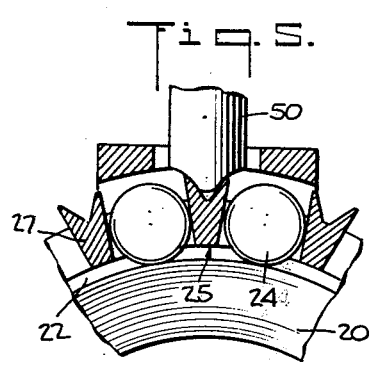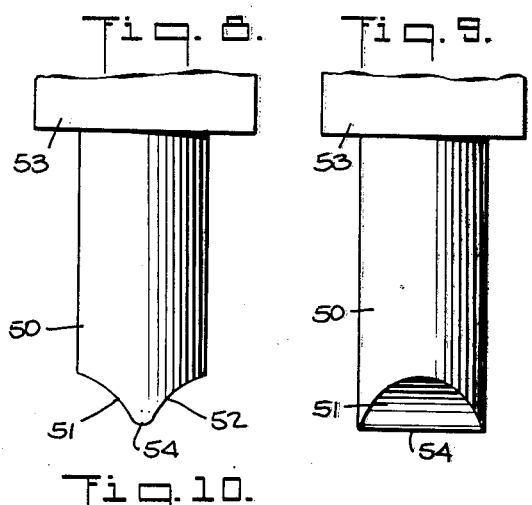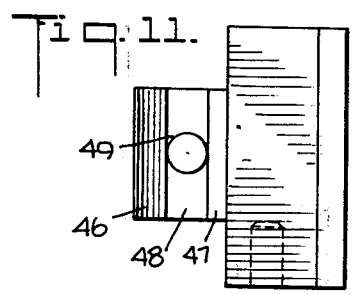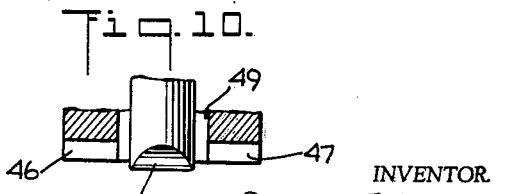
INVENTOR.
Daniel J. Howles
BY Frank C. Bauer
his ATTORNEY June 15, 1965  D. J. HOWLES  3,188,719
PROCESS FOR MANUFACTURING ROLLER BEARINGS
Filed March 1, 1963  3 Sheets-Sheet 2
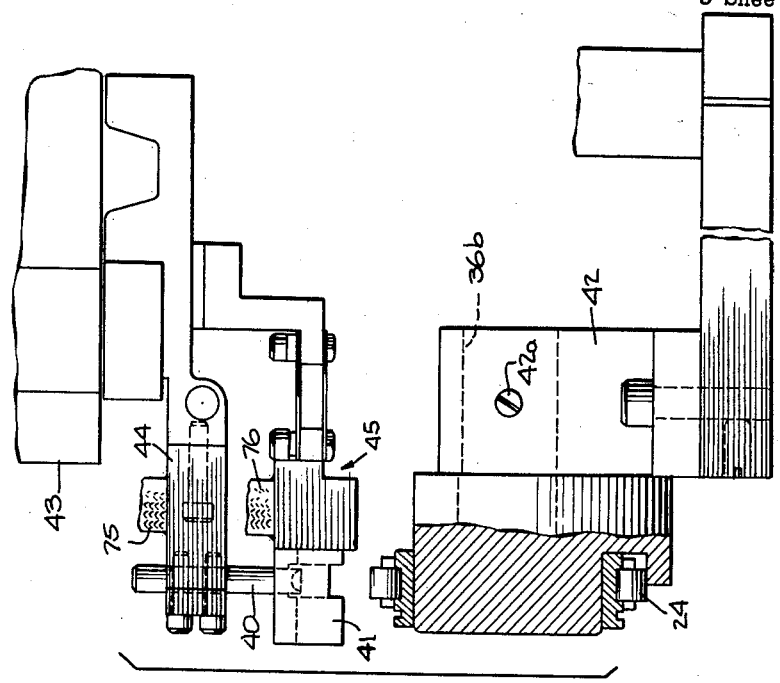
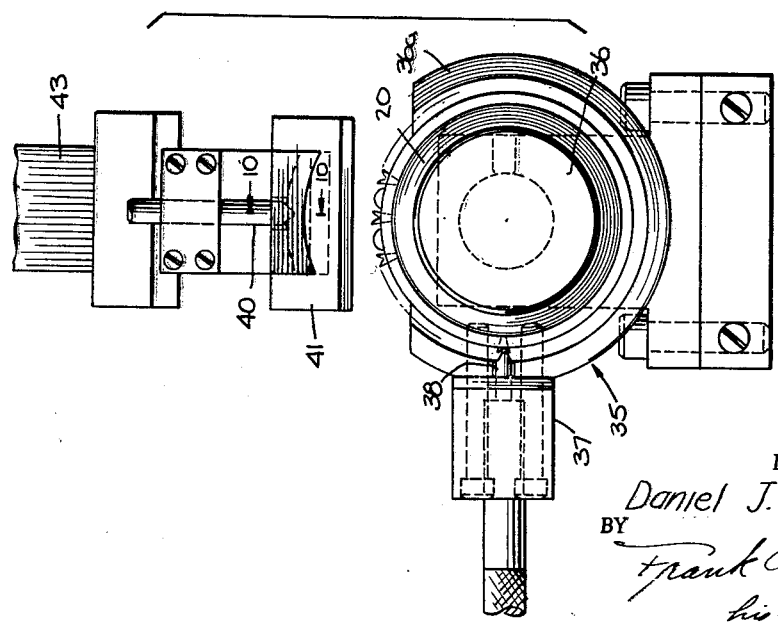
INVENTOR.
Daniel J. Howles
BY
Frank A. Bower
his ATTORNEY June 15, 1965  D. J. HOWLES  3,188,719
PROCESS FOR MANUFACTURING ROLLER BEARINGS
Filed March 1, 1963  3 Sheets-Sheet 3

United States Patent Office 3,188,719
Patented June 15, 1965

3,188,719
PROCESS FOR MANUFACTURING ROLLER BEARINGS
Daniel J. Howles, Jamestown, N.Y., assignor, by mesne assignments, to Thompson Ramo Wooldridge Inc., Euclid, Ohio, a corporation of Ohio
Filed Mar. 1, 1963, Ser. No. 262,127
6 Claims. (Cl. 29—148.4)

This invention relates to the manufacture of roller bearings and is directed particularly to the assembly of the retainer or cage on the rollers.

In the manufacture of roller bearings in large numbers it is desirable to have as few bearings as possible rejected in the manufacturing process and to produce bearings that have a high reliability. This objective should be attained with simple techniques and at a low unit cost. New roller bearings that operate under more severe conditions than present bearings require new materials which in turn require new methods of manufacture. In previous roller bearings the cage or retainer was manufactured from malleable metals such as bronzes and soft steels. These types of metals permitted bending and deforming of the cages without causing any rupture of the metal of the deformed part. For example, in some types of retainers lugs or projections extend over the space in which the roller is located. The bending of these lugs is done after the roller is placed in the space. The malleability of these metals permits this bending without rupturing the metal and without the necessity of any subsequent heat treatment of the cage or retainer.

Bearings are presently operated for longer periods at increased temperatures than in former uses. As a result, harder metals are required in the cages and retainers. This increased hardness makes it impossible to use the previous methods for bending the lugs of the cages for the retention of the rollers therein. Due to the hardness and lower ductility the lugs either crack in the manufacturing operation or develop microscopic cracks which cause subsequent failure of the bearing in operation. Thus new methods of lug bending were required which do not result in subsequent bearing failure and can be performed at a low cost of manufacturing.

An object of this invention is to manufacture trouble-free roller bearings with cages of low ductility in an inexpensive manner.

Another object of the invention is to provide a simple method for bending lugs of low ductility without forming ruptures.

Figure 13:
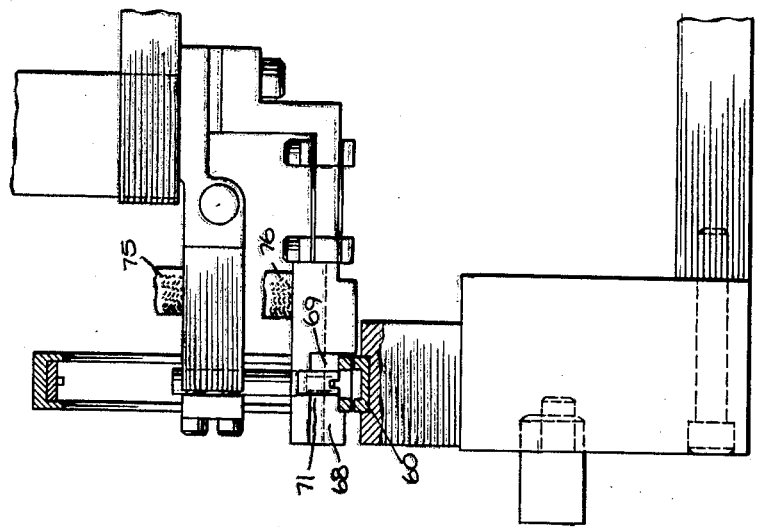
Figure 12:
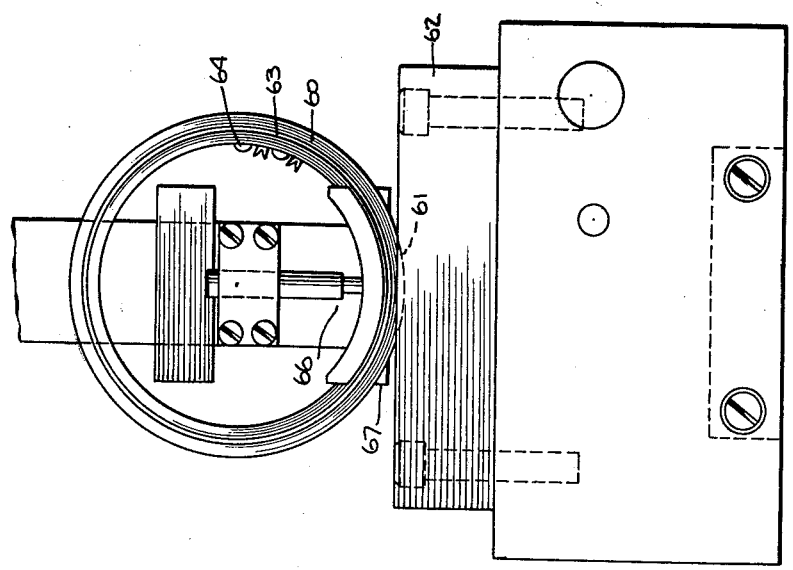

Other and further objects will be apparent from the following description taken in connection with the drawings in which FIG. 1 is a sectional view of a cage with unbent lugs;
FIG. 2 is a sectional view of a cage with unbent lugs having rollers and positioned on the inner race;
FIG. 3 illustrates a complete roller bearing with the lugs of the cage bent to retain the rollers in the spaces in the cage;
FIG. 4 is a top view of a cage with rollers and with the lugs bent in a retaining position;
FIG. 5 is a fragmentary sectional view of the manufacturing step with the electrodes in position immediately prior to the bending of outwardly extending lugs;
FIG. 6 is an end view of the manufacturing station with the electrodes in a raised position before lowering to bend the outwardly extending lugs;
FIG. 7 is a side view of the manufacturing station with the electrodes in a raised position and the mandrel and partially assembled bearing in section;
FIGS. 8 and 9 are front and side views respectively of the lug bending electrode;
FIG. 10 is a sectional view of the ground electrode and the forming electrode taken along lines 10—10 of FIG. 6;
FIG. 11 is a lower view of the ground electrode engaging the cage;
FIG. 12 is an end view of the work station bending inwardly projecting lugs; and
FIG. 13 is a side view of the station of FIG. 11.

The roller bearings have inner and outer races 20 and 21 with the race 20 having a groove 22 for the rollers 24. The rollers are held between the races and spaced circumferentially by a cake or retainer 25. The cage or retainer comprises a single piece of metal and has evenly spaced openings 26 for receiving rollers 24. The openings 26 are formed by the space bars 27 extending axially and side portions or margins 28 and 29 extending circumferentially. Each of the space bars 27 has lugs 30 and 31 which are on opposite edges of the bars and extend outwardly from the retainer above the margins 28 and 29. The lugs are ground so that the outer portions 30a, 31a of the lugs are narrower than the inner portions 30b, 31b, as illustrated in FIG. 1. The rollers fit loosely in the openings 26 and engage walls 27a and 27b on opposite sides of the bar depending on the direction of relative movement of the races. The diameter of the rollers is greater than the radial thickness of the cage. In order to retain the rollers in the cage on the inner race, the lugs 30 and 31 are bent over as illustrated in FIG. 3. The lugs are curved so as to conform generally to the curvature of the cylindrical surface of the roller.

In the manufacture of the roller bearings having the lugs radially beyond the rollers, the retainer or cage 25 is positioned around the inner race 20 and the rollers 24 are placed in the openings 26. The rollers are retained in the cage by placing the assembly of cage and inner race on a jig 35, as illustrated in FIG. 6, in rotatable relation thereto. The jig has an inner spindle 36 for receiving the inner race 20 in a conventional maner and an outer circular portion 36a engaging and holding the rollers 24. The portion 36a and the spindle are formed as a single piece and have a stub shaft 36b fitting in the supporting block 42. A set screw 42a indexes or positions the jig in proper relation to the lug bending means. The jig has a stop lock 37 with a spring loaded pin 38 which fits between the lugs on a given space bar to index the top lugs for engagement by the upper electrode 40. The portion 36a extends part way around the cage and rollers providing a space at the top for the lug forming electrodes to engage the cage. The lug bending and ground electrodes 40 and 41 are mounted on a movable head 43 actuated mechanically, hydraulically or any other suitable way to move linearly to and from spindle 36. The lug bending electrode 40 is held in the block 44 which is attached to the head 43. The ground electrode 41 is yieldably attached to the head 43 by the member 45. The electrode 41 is made of highly conductive metal and has two curved surfaces 46 and 47 spaced by a groove 48. The surfaces 46 and 47 have the same radii as the other surfaces of the margins 28 and 29. On the downward movement of the head 43 the surfaces 46 and 47 engage the margins 28 and 29 in a current passing contact for the transference of heavy currents between the retainer and the electrode 41. The rollers 24 protrude into the groove 48. As illustrated in FIG. 10, a rectangular opening 49 is provided through the ground electrode 41. The electrode 40 is held by the block 44 in this opening 49 with the tapered tip 50 of the lug bending electrode extending through the opening and with the end of the tip positioned in the groove 48. After the electrode 41 engages the cage 25, the electrode 41 is in the position as illustrated in FIG. 5 and engages the lugs 30 and 31. Current is then passed between the electrodes 40 and 41 to heat the lugs and then the head 43 is moved further downward to bend the lugs 30 and 31 by means of the curved surfaces 51 and 52 on the electrode 41. The resiliency of the support 45 permits this continued movement which is approximately three-thousandths of an inch. The head 43 is then raised and the cage 25 and inner race 20 with rollers 24 are indexed to the next set of lugs and the operation again performed. Thus the lugs are deformed by a single operation.

The rectangular portion 53 is firmly clamped in the block 44 with cylindrical tip portion 50 projecting through the ground electrode for engaging the cage lugs. The lug engaging surfaces 51, 52 are concavely curved to bend the lugs over and impart a curved shape to the lugs. The lug bending or forming electrode comprises a material of higher resistance than the other electrode to concentrate the heat build up in the lugs. As previously mentioned, the lugs have an outwardly tapered shape so that the free end is thinner than the base. Between the curved lug engaging surface is a convex surface 54. The curved surfaces extend parallel to the axis of the bearing. The ground electrode is made of a copper alloy and the curved surfaces 46, 47 are silver plated for good current conductivity. The bending electrode engages the lugs at the convex surfaces 51 and 52 and passes current therethrough to heat the lugs to a given temperature before deforming the lugs. For a SAE 4340 type steel the lugs must be raised to a temperature of approximately 1100° F. After the lugs have reached the specified temperature, the electrode moves down so that the curved surfaces 51, 52 bend the lugs into a curved shape for retaining the rollers within the cage.

The ground electrode engages the margins of the cage in a firm electrical contact at approximately the same time that the surfaces 51, 52 engage the lugs. As previously described, the curved surfaces of the ground electrode engage the cage circumferentially on each side of the space bar having the lugs engaged by the bending electrode. Thus the shortest possible electrical path is provided through the lugs and space bar to the margins on each side. This path will have the lowest resistance and will, therefore, pass heavy currents. Some current will pass through the adjacent rollers. However, due to the lower resistance path and the rather poor conduction current between the cage and the loosely fitting rollers, arcing is prevented between the cage and the rollers thus avoiding any damage to the highly finished surface of rollers. The electrodes are moved down quickly and precisely so that the lug bending may be performed in a minimum time. After the pair of lugs have been bent, the cage can be indexed as previously described for the next operation. After all the rollers are positioned and the lugs bent, the inner race and cage are removed from the jig and the outer race mounted in the usual manner.

In FIGS. 12 and 13 the apparatus for bending inwardly projecting lugs is illustrated. The outer race 60 rests in a depression 61 in the supporting means 62 with the race standing in a vertical position. The outer race has a groove 63 for receiving the rollers 64 and the cage 65 is concentrically positioned within the outer race. The lug bending and ground electrodes 66, 67 are supported in the same manner as the corresponding electrodes of the embodiment illustrated in FIGS. 6 and 7. The lug bending or forming electrode 66 is of substantially the same configuration as the electrode 40 for deforming the outwardly projecting lugs, taking into account the lesser bending required of the inner lugs. The ground electrode 67 has convex surfaces 68, 69 spaced by the groove 70. The electrode surfaces 68, 69 engage the inner surfaces of the margins of the cage on each side of the rollers. A rectangular shaped opening 71 is provided to pass the lug bending electrode. The operation is the same as in the embodiment of FIGS. 6 and 7. The electrodes 66, 67 are mounted on the movable head and extend into the opening formed by the cage and outer race. The electrodes move downwardly with the ground electrode engaging the inner surfaces of the margins and the bending electrode engaging the lugs in an electric current transferring contact. The head continues to move downwardly pressing the ground electrode into firmer contact and lowering the bending electrode to bend the lugs into a roller holding position. The initial contact of the electrode with the cage passes a high current with a high current density in the lugs to create sufficient heat to permit bending of the lugs without cracking. After the bending is completed, the cage is rotated and the succeeding roller fitted into the next opening and the lugs bent as described. When all the lugs are locked in the groove of the outer race, the bearing is removed and the inner race fitted in the rollers in the usual manner.

The current is supplied by a resistance welder (not shown) through the electrical connections 75, 76. The welder may be a single phase synchronous type or any other suitable type of welder. The lug bending or forming electrode is of a high resistance metal to confine the heat build up to the lugs so that the proper temperature for bending is attained in a short period. The lugs have to be raised to a given temperature, depending upon the material of the connection in order to coordinate the temperature of the lug and the time and the amount of pressure applied.

I claim:

1. A method for assembling roller bearings having inner and outer races with a retainer having roller receiving openings separated by bars with retaining lugs comprising mounting of a race and a retainer in generally concentric relation on a jig, incrementally moving the retainer to successive positions, placing rollers in the openings, moving a ground electrode into engagement with the retainer and a deforming electrode into engagement with the lugs, passing of current through the ground electrode retainer and lugs to heat the engaged lugs to a malleable condition without causing sparking between the retainer and the rollers, and then further pressing the deforming electrode to bend the engaged malleable lugs over an adjacent roller into spaced roller retaining position.

2. A method for assembling roller bearings having inner and outer races with a retainer having roller receiving openings separated by bars with retaining lugs comprising mounting an inner race and retainer on a jig, positioning rollers in the openings, pressing a ground electrode against the retainer adjacent the lugs to be deformed, pressing a deforming electrode against the retaining lugs to pass current through the lugs and retainer and the ground electrode to heat the lugs to a malleable condition and further pressing the deforming electrode to bend the lugs to a roller retaining position and fitting the outer race on the assembled rollers to form a roller bearing.

3. A method for assembling roller bearings having inner and outer races with a retainer having roller retaining lugs between roller receiving openings comprising mounting an outer race and a retainer on a support with the retaining lugs projecting inwardly, positioning rollers in the openings and pressing a ground electrode against the retainer adjacent the lugs to be deformed, and pressing a deforming electrode against the lugs to pass current through the retainer to heat the lugs to a malleable condition and further pressing the lugs to bend the lugs to a roller retaining position and fitting the inner race on the assembled rollers to form a roller bearing.

4. A method for assembling roller bearings having a metal retainer with circumferentially spaced lugs mounted on a space bar extending between circumferentially extending margin portions comprising pressing a ground electrode firmly against the margin pieces for transference of current therewith on opposite sides of said lugs and moving a deforming electrode between and against said lugs to pass current therethrough and heat the lugs to a state of malleability and then pressing and curving the lugs by the deforming electrode to a spaced roller retaining position.

5. Apparatus for assembling a roller bearing having inner and outer races and a roller retainer with roller retaining lugs comprising a jig for supporting a race and retainer, a ground electrode engaging the retainer on opposite sides of roller retaining lugs, a deforming electrode positioned within the ground electrode for engaging the lugs, means for reciprocally supporting the ground electrode and the deforming electrode to move the electrodes into engagement for passing heating current through the retainer and then moving the deforming electrode to bend the lugs over the rollers into a spaced roller retaining position.

6. Apparatus as set forth in claim 5 wherein said supporting means comprises a head having separate blocks attached thereto for holding the deforming electrode and the ground electrode respectively, said block holding said ground electrode being yieldable on the continued movement of said head to permit said deforming electrode to bend the lugs.

References Cited by the Examiner
UNITED STATES PATENTS

| | | | |
|---|---|---|---|
| 1,525,086 | 2/25 | Murray et al. | 219—150.5 |
| 1,978,363 | 10/34 | Fuchs et al. | 219—150.5 |
| 2,454,028 | 11/48 | Baker et al. | 29—148.4 |
| 2,897,582 | 8/59 | Blazek et al. | 29—148.4 |
| 3,026,601 | 3/62 | Potter | 29—148.4 |

WHITMORE A. WILTZ, *Primary Examiner.*

THOMAS H. EAGER, *Examiner.*